United States Patent [19]

Miyamori et al.

[11] Patent Number: 5,604,285
[45] Date of Patent: Feb. 18, 1997

[54] RESIN COMPOSITION FOR SLIDING PART

[75] Inventors: Tsuyoshi Miyamori; Masami Kato; Masaji Komori; Tetsuo Shimizu, all of Settsu, Japan

[73] Assignee: Daikin Industries, Ltd., Osaka, Japan

[21] Appl. No.: 355,202

[22] Filed: Dec. 8, 1994

Related U.S. Application Data

[63] Continuation of Ser. No. 170,283, filed as PCT/JP93/00671, May 20, 1993, abandoned.

[30] Foreign Application Priority Data

May 21, 1993 [JP] Japan ................................... 4-128625

[51] Int. Cl.⁶ ........................................ C08K 3/00
[52] U.S. Cl. ..................... 524/439; 524/440; 524/413; 524/495; 524/496
[58] Field of Search ................................. 524/439, 440, 524/413, 495, 496

[56] References Cited

U.S. PATENT DOCUMENTS

| | | | |
|---|---|---|---|
| 4,163,742 | 8/1979 | Mansure | 524/496 |
| 4,370,436 | 1/1983 | Nakamura | 524/439 |
| 4,414,356 | 11/1983 | Michel | 524/496 |
| 4,665,113 | 5/1987 | Eberl | 524/440 |
| 4,743,658 | 5/1988 | Imbalzano | 525/326.4 |
| 4,749,752 | 6/1988 | Youlu | 524/439 |
| 4,824,898 | 4/1989 | Sugihara et al. | 524/401 |
| 5,194,484 | 3/1993 | Logothetis | 524/494 |

FOREIGN PATENT DOCUMENTS

| | | |
|---|---|---|
| 0107793 | 5/1984 | European Pat. Off. |
| 55-165938 | 12/1980 | Japan . |
| 60-65049 | 4/1985 | Japan . |
| 60-262844 | 12/1985 | Japan . |
| 62-81442 | 4/1987 | Japan . |
| 6445497 | 2/1989 | Japan . |
| 3247609 | 11/1991 | Japan . |
| 420507 | 1/1992 | Japan . |

OTHER PUBLICATIONS

CPI—Profile Booklet 1983 01801 J/47.
Kunststoff–Handbuch, vol. XI., entitled "Polyacetale, epoxidharze, fluorhaltige Polymerisate, Silicone usw," pp. 369–379 (1971).
Communication from German Patent Office in P 43 94 144.2–43, mailed Mar. 16, 1995.

Primary Examiner—Edward J. Cain
Attorney, Agent, or Firm—Varndell Legal Group

[57] ABSTRACT

A resin composition for a sliding part comprising 5 to 45% by volume of a carbon fiber, 1 to 25 by volume of a metal powder and a remaining amount of a melt-processable fluorine-containing resin. A molded article made of the composition has a low friction coefficient having a narrow fluctuation range and has an excellent abrasion resistance to a soft metal.

16 Claims, 1 Drawing Sheet

RESIN COMPOSITION FOR SLIDING PART

This application is a continuation application of Ser. No. 08/170,283, filed as PCT/JP93/00671, May 20, 1993 now abandoned.

TECHNICAL FIELD

The present invention relates to a resin composition suitable for sliding uses, particularly for a dynamic sealant and a bearing.

BACKGROUND ART

Up to now, as a molding resin composition for a sliding part, there is known a composition obtained by adding several fillers to a polytetrafluoroethylene (PTFE) powder. For example, JP-B-36081/1974 and JP-A-72770/1983 disclose a resin composition having an improved sliding characteristic obtained by mixing a PTFE powder with a metal powder and a carbon graphite or a carbon fiber. However, since PTFE can not be subjected to melt-process such as an ordinary injection molding, the PTFE must be processed by a compression molding method having a low process productivity. Further, in a composition for the compression molding, aspect ratio of a fibrous material which is mixed should be small in view of pressure transferability. Consequently, the obtained molded article is not fully improved in mechanical strength.

Also, there are known injection moldable resin compositions obtained by adding various fillers (for example, a carbon fiber and molybdenum disulfide) to a melt-processable fluorine-containing resin such as tetrafluoroethylene-ethylene copolymer (for example, PLASTIC, Vol. 42, No. 7, pages 51 to 53). However, these compositions do not fully satisfy requirements that the sliding characteristic at a high temperature, particularly abrasion coefficient should be made lower and fluctuation range of friction resistance should be made smaller. Also, the compositions have insufficient abrasion resistance to a soft metal such as aluminium.

An object of the present invention is to provide a melt-processable resin composition for producing a fluorine-containing resin molded article which is improved in the sliding characteristic at a high temperature and the abrasion resistance to a soft matal while maintaining mechanical strengths.

DISCLOSURE OF THE INVENTION

The resin composition of the present invention comprises (a) 5 to 45% by volume of a carbon fiber, (b) 1 to 25% by volume of a metal powder and (c) a remaining amount of a melt-processable fluorine-containing resin.

BEST MODE FOR CARRYING OUT THE INVENTION

Figure 1:
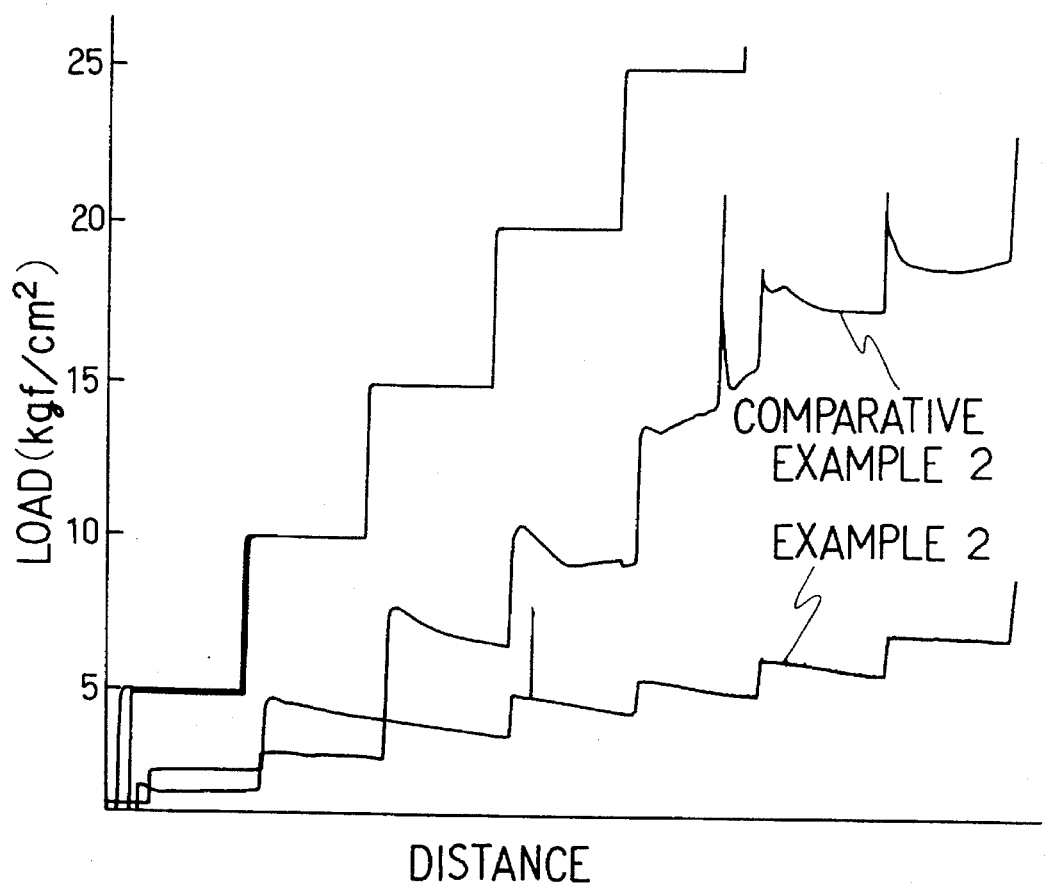
FIG. 1 shows a chart of abrasion coefficients measured when a load is changed, in Example 2 and Comparative Example 2.

Examples of the melt-processable fluorine-containing resin used in the present invention are, for instance, tetrafluoroethylene-fluoroalkyl vinyl ether copolymer (PFA), tetrafluoroethylene-hexafluoropropylene copolymer (FEP), tetrafluoroethylene-ethylene copolymer (ETFE), poly(vinylidene fluoride) (PVdF), polychlorotrifluoroethylene (PCTFE) and the like.

The copolymer PFA is preferably a copolymer of tetrafluoroethylene with at least one of fluoroalkyl vinyl ethers having the general formula:

$$CF_2=CFO(CF_2)_mX$$

wherein X is hydrogen atom, chlorine atom or fluorine atom, m is an integer of 1 to 6, or the general formula:

$$CF_2=CF(O-CF_2CF(CF_3))_nOC_3F_7$$

wherein n is an integer of 1 to 4. The particularly preferable PFA copolymer is a copolymer of 92 to 99% by weight of tetrafluoroethylene with 1 to 8% by weight of fluoroalkyl vinyl ether. The preferable FEP is copolymer of 87 to 96% by weight of tetrafluoroethylene with 4 to 13% by weight of hexafluoropropylene. The preferable ETFE is a copolymer of 74.5 to 89.3% by weight of tetrafluoroethylene with 10.7 to 25.5% by weight of ethylene.

These melt processable fluorine-containing resins may be a copolymer copolymerized with other copolymerizable comonomer in such an amount that essential characteristics of the resins are not degraded. Examples of the other comonomers are, for instance, tetrafluoroethylene, hexafluoropropylene, perfluoroalkyl vinyl ether, perfluoroalkyl($C_1$ to $C_{10}$) ethylene, perfluoroalkyl($C_1$ to $C_{10}$) allyl ether, a compound having the general formula:

$$CF_2=CF[OCF_2CFRf(CF_2)_p]_qOCF_2(CF_2)_rY$$

wherein Rf is fluorine atom or trifluoromethyl group, Y is a halogen atom, p is 0 or 1, q is 0 or an integer of 1 to 5, r is 0 or an integer of 1 to 2, provided that when p is 1, Rf being fluorine atom, and the like.

Among them, PFA and FEP are preferable, and PFA is particularly preferable.

PFA and FEP have an excellent heat resistance and chemical resistance, and are used in many technical fields such as semiconductor-related field. However, due to initiators and chain transfer agents used in the copolymerization of PFA or FEP, there exist a small amount of end groups including atoms other than fluorine atom in the polymerization chain ends. Some of these polymer end groups, like an acid fluoride end group, are decomposed by heating and the resulting eluted fluorine ion corrodes metals. Therefore, since metal powders are used in the present invention, the fluorine-containing resin in which such unstable end groups are stabilized is desirable. The stabilizing methods of the unstable end groups have been known. For example, there are employed a method in which amidation is conducted by reacting with ammonia, a method in which methyl-esterification is conducted by reacting with methanol, a method in which perfluorination is conducted by reacting with fluorine gas (Ihara et al., VULCAR REVIEW, Vol. 35, No. 3, pages 34 to 40 (1991)), and the like. The stabilizing method, however, is not limited to the above-described methods.

The carbon fiber used in the present invention is added for purposes of improving dimension stability, resinforcing ability, friction and abrasion resistance and creep resistance. For most effective attainment of the above-mentioned purposes in molded sliding parts, it is desirable that an average fiber diameter is 10 to 30 μm and an average aspect ratio is 8 to 300 in the mixed composition. However, the average fiber diameter and the average aspect ratio have to be selected in consideration of possibility that the fiber may be broken under shearing stress during mixing and molding. Therefore, before the mixing, it it desirable that the average fiber diameter of the carbon fiber is 10 to 30 μm and the average aspect ratio is 20 to 300. Conventional carbon fibers can be adopted without specific restriction. For example, there is exemplified a fibrous substance having a carbon content of not less than 90% by weight prepared by using rayon, PAN (polyacrylonitrile), pitch or the like as a starting material. Further, the same effect may be expected by using carbon whiskers having an average fiber diameter of not more than 1 μm prepared by gas phase growth method and the like.

The carbon fiber is mixed so that its contect in the essential components is 5 to 45% by volume, preferably 10 to 20% by volume. When the content is smaller than that, reinforcing effect by the carbon fiber cannot be obtained. On the other hand, when the content is too large, flowability when mixed with the metal powder is lost and the fibers are frequently broken, and then, the expected effects cannot be obtained.

The metal powder is usually added to improve heat conductivity, electric conductivity, compression characteristic and the like. In the present invention, the metal powder has effects that the friction coefficient at a high temperature is lowered and the fluctuation range of friction resistance is made smaller, in addition to the above-mentioned effects. As the metal powder used in the present invention, there may be used one of or a mixture of various powders of a copper-based metal, aluminium-based metal, iron-based metal and the like. Among them, a metal powder of copper-based metal, particularly a bronze powder is preferable because of its excellent heat conductivity and sliding ability. The metal powder having a particle size of 20 to 53 μm is used. Such range of particle size means that the metal powder passes through a sieve having a sieve opening of 53 μm and remains on a sieve having a sieve opening of 20 μm. When the particle size of the metal particle is larger than 53 μm, elongation and strength of the resin may be lowered. When smaller than 20 μm, the same characteristics as the case of larger than 53 μm may be lowered due to the secondary agglomeration.

The metal powder is incorporated in an amount of 1 to 25% by volume, preferably 3 to 10% by volume in the essential components. When more than this range, the effect to lessen the weight of the resin composition is difficult to obtain. When too small, the fluctuation range of friction coefficient is difficult to be made narrower.

The metal powder and the carbon fiber may be subjected, occasion demands, to surface treatment such as fluorination treatment or treatment using a coupling agent to enhance affinity with the fluorine-containing resin.

Further, to the resin composition for sliding part of the present invention may be added in combination of various additives such as inorganic or organic fillers for reinforcement, compatibilizers, lubricants (fluorinated carbon, carbon graphite, molybdenum disulfide) and stabilizers, provided that they do not interfere with the purposes of the present invention.

Known mixing methods are adopted in preparation of the resin composition of the present invention. For example, the components may be mixed with a mixer such as a V-type blender, a tumbler or Henschel mixer, subsequently the mixture may be kneaded to be pelletized with a melt kneading apparatus such as a biaxial extruder. Also, the carbon fiber and the metal powder can be fed to the melted fluorine-containing resin in the melt kneading apparatus in the course of the kneading.

Thus obtained pellets can be molded into a molded article having the desired shape such as sheets, pipes or boards, with a molding machine for a usual thermoplastic resin such as an injection molding machine, a compression molding machine or an extrusion molding machine.

The obtained molded article is suitable for various sealants and bearings, for example, a sealing used for a car, a sealant used for a compressor and the like, since the article has an excellent sliding characteristic and mechanical strength at high temperature.

The composition of the present invention is explained by means of the following Examples. The present invention, however, is not limited to the Examples.

EXAMPLES 1 to 2

A carbon fiber (M-207 S available from Kreha Chemical Industry Co., Ltd., average fiber diameter of 14.5 μm and average aspect ratio of 48) and a bronz powder (Bro-SD available from Fukuda Kinzoku Hakufun Kogyo Kabushiki Kaisha, average particle size of 40 μm) were blended with a PFA powder of which unstable end groups were stabilized (Neofron PFA AP-210SH available from Daikin Industries Ltd.) in a mixing proportion shown in Table 1 with Henshell mixer. Then, the mixture was melt and mixed to be pelletized with a uniaxial extruder at 270° to 380° C., preferably at 270° to 300° C.

The obtained pellets were fed to an injection molding machine (cylinder temperature 300° to 400° C., mold temperature 200° C.), and test pieces to be tested were made. Temperature of deflection under load, heat conductivity and friction coefficient of the test pieces were measured according to the following manners. Results are shown in Table 1 and FIG. 1. FIG. 1 is a chart of the friction test of Example 2.

(Temperature of Deflection under Load)

Temperature of deflection under load is measured under a load of 18.6 kgf/cm$^2$ according to ASTM D 648 with Heat Distortion Tester available from Yasuda Seiki Kabushiki Kaisha.

(Heat Conductivity)

Heat conductivity is measured with Quick Thermal Conductivity Meter available from Kyoto Denshi Kogyo Kabushiki Kaisha.

(Friction Coefficient)

Friction coefficient is measured with Suzuki-Matsubara Thrust Washer Tester available from Orientic Kabushiki Kaisha under following conditions:

Load: 5→10→15→20→25 kgf/cm$^2$

Speed: 200 m/minute

Temperature: 150° C.

Atmosphere: In oil (Suniso 4GS)

Distance: 1.0 km at each load

Subject material: Aluminium (S 45C)

COMPARATIVE EXAMPLES 1 to 2

Compositions which were not mixed with the bronz powder were prepared in mixing proportions shown in Table 1. Each composition was pelletized in the same manner as in Example 1, and then injection-molded to make test pieces.

The physical properties of respective test pieces were measured in the same manner as in Example 1. The results are shown in Table 1 and FIG. 1.

It is evident from Table 1 and FIG. 1 that the composition of the present invention provides a molded article having a narrow fluctuation range of friction coefficient.

TABLE 1

|  | Example 1 | Example 2 | Comparative Example 1 | Comparative Example 2 |
|---|---|---|---|---|
| Composition | | | | |
| Fluorine resin (% by volume) | 82 | 75 | 82 | 75 |
| Carbon fiber (% by volume) | 15 | 16 | 18 | 25 |
| Bronz (% by volume) | 3 | 9 | 0 | 0 |
| Temperature of deflection under load (°C.) | 91 | 153 | 156 | 210 |
| Heat conductivity (W/m · K) | 0.319 | 0.395 | 0.309 | 0.330 |
| Friction coefficient Load | | | | |
| 5 kgf/cm$^2$ | 0.026 | 0.026 | 0.052 | 0.050 |
| 10 kgf/cm$^2$ | 0.033 | 0.026 | 0.057 | 0.057 |
| 15 kgf/cm$^2$ | 0.036 | 0.032 | 0.067 | 0.032 |
| 20 kgf/cm$^2$ | 0.028 | 0.030 | 0.072 | 0.030 |
| 25 kgf/cm$^2$ | 0.028 | 0.030 | 0.103 | 0.030 |

INDUSTRIAL APPLICABILITY

By incorporating the metal powder and the carbon fiber in combination into the melt-processable fluorine-containing resin, a molded article suitable for sliding use is provided. The molded article has a narrow fluctuation range of friction coefficient when the load varies, as well as a low friction coefficient at sliding at a high temperature and shows an extremely stable sliding characteristic. Also, the molded article provides an improved abrasion resistance between a surface of the molded article and a surface of a soft metal such as aluminium. The molded article is suitable for various sealants and bearings, for example, sealings, sealants used for compressors and the like.

We claim:

1. A resin composition for a sliding part comprising (a) 5 to 45% by volume of a carbon fiber, (b) 1 to 25% by volume of a metal powder and (c) a remaining amount of a melt-processable fluorine-containing resin, wherein the carbon fiber, the metal powder and the fluorine-containing resin are mixed while the fluorine-containing resin is in a molten state, and the resin composition is flowable when the fluorine-containing resin is in a molten state.

2. The composition of claim 1, wherein the carbon fiber has an average fiber diameter of 10 to 30 μm and an average aspect ratio of 8 to 300.

3. The composition of claim 1, wherein the metal powder is a copper-based metal powder.

4. The composition of claim 2, wherein the metal powder is a copper-based metal powder.

5. The composition of claim 1, wherein the fluorine-containing resin is tetrafluoroethylene-perfluoro (alkyl vinyl ether) copolymer or tetrafluoroethylene-hexafluoropropylene copolymer, unstable end groups of said copolymers being stabilized.

6. The composition of claim 2, wherein the fluorine-containing resin is tetrafluoroethylene-perfluoro (alkyl vinyl ether) copolymer or tetrafluoroethylene-hexafluoropropylene copolymer, unstable end groups of said copolymers being stabilized.

7. The composition of claim 3, wherein the fluorine-containing resin is tetrafluoroethylene-perfluoro (alkyl vinyl ether) copolymer or tetrafluoroethylene-hexafluoropropylene copolymer, unstable end groups of said copolymers being stabilized.

8. The composition of claim 4, wherein the fluorine-containing resin is tetrafluoroethylene-perfluoro (alkyl vinyl ether) copolymer or tetrafluoroethylene-hexafluoropropylene copolymer, unstable end groups of said copolymers being stabilized.

9. A molded article having improved sliding properties made from a composition comprising (a) 5 to 45% by volume of a carbon fiber, (b) 1 to 25% by volume of a metal powder and (c) a balance of a melt-processable fluorine-containing resin, wherein the article is prepared by mixing the composition with the fluorine-containing resin in a molten state, and the composition is flowable when the fluorine-containing resin is in a molten state.

10. The molded article of claim 9, wherein the carbon fiber has an average fiber diameter of 10 to 30 μm and an average aspect ratio of 8 to 300.

11. The molded article of claim 9, wherein the metal powder is a copper-based metal powder.

12. The molded article of claim 10, wherein the metal powder is a copper-based metal powder.

13. The molded article of claim 9, wherein the fluorine-containing resin is tetrafluoroethylene-perfluoro (alkyl vinyl ether) copolymer or tetrafluoroethylene-hexafluoropropylene copolymer, unstable end groups of said copolymers being stabilized.

14. The molded article of claim 10, wherein the fluorine-containing resin is tetrafluoroethylene-perfluoro (alkyl vinyl ether) copolymer or tetrafluoroethylene-hexafluoropropylene copolymer, unstable end groups of said copolymers being stabilized.

15. The molded article of claim 11, wherein the fluorine-containing resin is tetrafluoroethylene-perfluoro (alkyl vinyl ether) copolymer or tetrafluoroethylene-hexafluoropropylene copolymer, unstable end groups of said copolymers being stabilized.

16. The molded article of claim 12, wherein the fluorine-containing resin is tetrafluoroethylene-perfluoro (alkyl vinyl ether) copolymer or tetrafluoroethylene-hexafluoropropylene copolymer, unstable end groups of said copolymers being stabilized.

* * * * *